United States Patent [19]

Kurtz

[11] Patent Number: 5,005,612

[45] Date of Patent: Apr. 9, 1991

[54] METHOD AND APPARATUS FOR TRANSFERRING HIGH VISCOSITY LIQUID WORK PRODUCT FROM A DRUM TO A WORK STATION

[76] Inventor: John M. Kurtz, 3175 Fulton Rd., Cleveland, Ohio 44109

[21] Appl. No.: 450,542

[22] Filed: Dec. 14, 1989

[51] Int. Cl.[5] ........................ B01F 15/02; B65G 53/14

[52] U.S. Cl. ........................................ 141/7; 141/65; 141/270; 141/280; 366/191; 366/195; 366/309; 137/565; 406/115

[58] Field of Search ........................ 141/7, 65, 66, 250, 141/270, 280; 137/123, 140, 153, 565; 366/191, 195, 196, 309; 406/113, 114, 115

[56] References Cited

U.S. PATENT DOCUMENTS

| | | | |
|---|---|---|---|
| 3,230,282 | 1/1966 | Campagne et al. | 366/195 X |
| 3,468,520 | 9/1969 | Duryea et al. | 366/191 |
| 3,942,771 | 3/1976 | Knutsen | 366/309 |
| 3,951,462 | 4/1976 | DeFrancisci | 406/114 |
| 4,165,185 | 8/1979 | Fejmert | 366/309 X |
| 4,450,141 | 5/1984 | Linde | 366/309 X |
| 4,452,377 | 6/1984 | Hurley | 141/65 X |
| 4,582,099 | 4/1986 | McDaniel et al. | 141/65 |
| 4,721,137 | 1/1988 | Muller | 141/65 |
| 4,859,073 | 8/1989 | Howseman, Jr. et al. | 366/195 |

FOREIGN PATENT DOCUMENTS

| | | | |
|---|---|---|---|
| 0839931 | 6/1981 | U.S.S.R. | 406/114 |

*Primary Examiner*—Ernest G. Cusick

*Attorney, Agent, or Firm*—James H. Tilberry

[57] ABSTRACT

Printers' ink liquid work product transfer apparatus is provided to transfer raw printers' ink work product stored in drums to a remote location for processing into finished commercial printers' ink. The mechanism includes means to provide substantially simultaneous operations comprising: rotating the drum; scraping product residue from the interior wall surface of the drum; pumping the work product from the drum; and lowering the nozzle of a pump connected work product inlet tube in a work product-filled drum at the same rate that the level of the work product is lowered in the drum by pumping action. When the nozzle of the work product inlet tube reaches the bottom of the drum, the work product in the drum will have been substantially completely emptied of work product.

7 Claims, 5 Drawing Sheets

METHOD AND APPARATUS FOR TRANSFERRING HIGH VISCOSITY LIQUID WORK PRODUCT FROM A DRUM TO A WORK STATION

BACKGROUND OF THE INVENTION

This invention relates to the art of making printers' ink. It is presently the practice in the ink manufacturing industry to prepare a preliminary high viscosity liquid product, herein referred to as the "work product," which is then transported by overhead cranes in pouring ladles to ink processing equipment, such as ball pulverizers, pulverizing mills or the like, which pulverize and reduce certain solids in the ink to very fine dimensions required for the final ink product. This is an expensive process requiring capital outlay for overhead cranes and the services of crane operators and floor workmen. As with all overhead crane operations transporting heavy loads, there is always an inherent danger to workmen and equipment beneath the crane where these operations take place.

SUMMARY OF THE INVENTION

The subject invention has been developed to overcome the shortcomings of the prior art method and apparatus for manufacturing printers' ink.

In the preferred embodiment of the invention hereinafter more fully disclosed, apparatus is provided to receive a drum of work product; to rotate the drum; to scrape work product residue from the interior surface of the drum; and to pump the work product directly from the drum to work product pulverizing machinery.

A turntable is provided near floor level upon which a work product-filled drum is placed. The frame base structure supporting the turntable also supports an upright vertically extendible stanchion to which an L-shaped boom is secured at the top of the stanchion. The lower end of the stanchion is rigidly secured to the base, such as by welding. A horizontal leg of the L-shaped boom is connected at one end to a swivel mounted on the top of the stanchion. A vertical leg of the boom depends downwardly from the horizontal leg to carry a work product pump, a work product withdrawal tube and nozzle, and a work product residue scraper. The swivel is powered to sweep the boom horizontal leg through a horizontal plane.

In operation, the stanchion is extended upwardly until the lowermost appendage of the vertical leg of the boom provides clearance for a work product-filled drum. The drum is approximately 48" in diameter and from 48" to 60" in height. Work product filled, it weighs approximately 4000 pounds. A work product-filled drum is then placed on the turntable, and the stanchion is retracted until the product withdrawal tube nozzle meets the top surface of the work product in the drum. The boom is then shifted about the stanchion swivel until the scraper is brought into pressure contact with the interior surface of the drum. Thereafter, motor means mounted beneath the turntable rotate the turntable and the drum mounted thereon. The pump is actuated to pull the work product into the work product withdrawal tube while the stanchion is being slowly retracted to lower the vertical leg of the boom into the drum. Means are provided to synchronize the lowering of the boom with the lowering of the level of the work product so that the work product withdrawal nozzle reaches the bottom of the drum simultaneously with the withdrawal from the drum of the last remaining portion of the work product. The stanchion is once again extended in order to remove the vertical portion of the boom from the interior of the drum, the empty drum is removed, and the process may then be repeated.

OBJECTS OF THE INVENTION

It is among the objects of this invention to provide a method and apparatus for transferring a high viscosity work product from a drum to a work station for further processing which is safer to practice and which apparatus is safer to operate than prior art apparatus; is less expensive than previous methods; is more efficient; requires less floor space; requires less maintenance; and delivers a more homogeneous product from the drum than prior art methods and apparatus.

The foregoing and other objects, features, and advantages of the invention will become apparent from the description set forth hereinafter when considered in conjunction with the accompanying drawings.

DETAILED DESCRIPTION OF THE PREFERRED EMBODIMENT OF THE INVENTION

Figure 1:
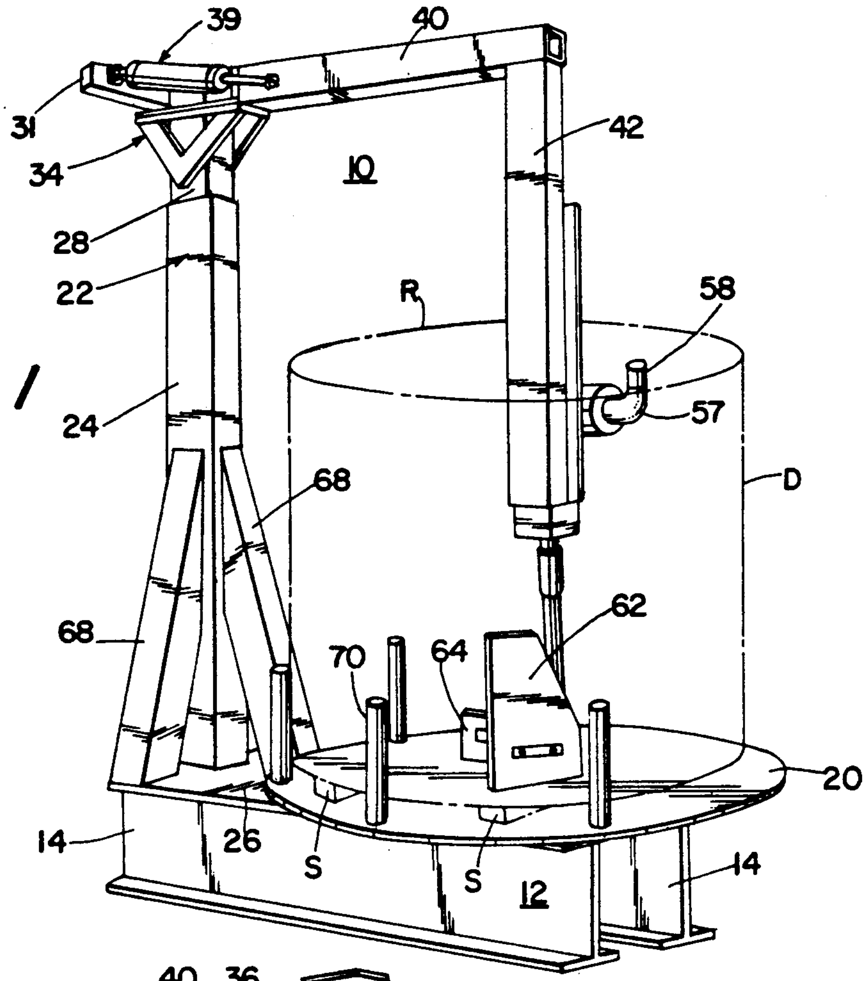
FIG. 1 is a front elevational perspective view of a preferred embodiment of the invention.
Figure 2:
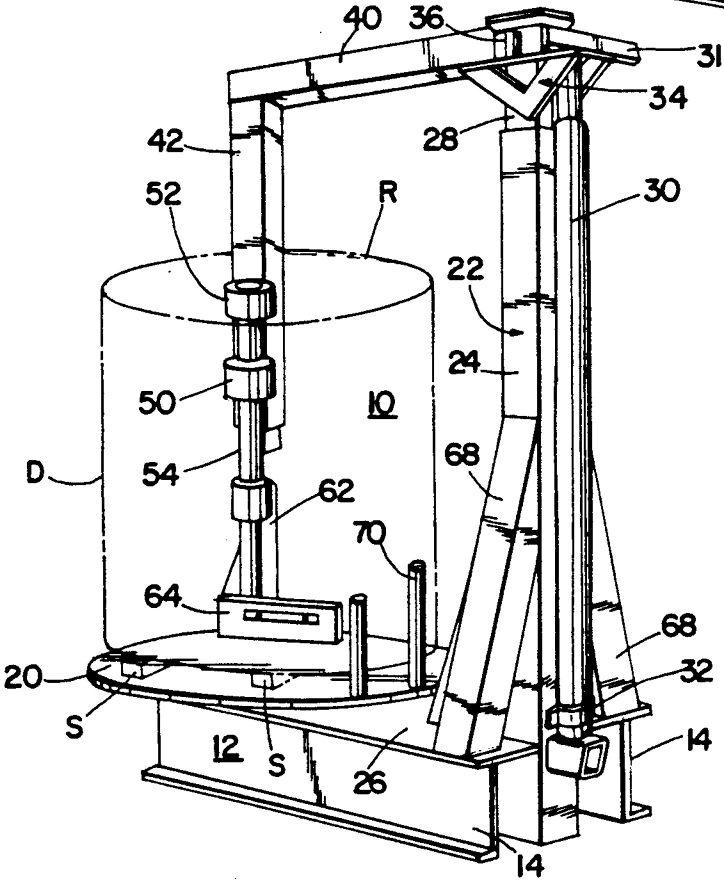
FIG. 2 is a rear elevational perspective view of the preferred embodiment of the invention shown in FIG. 1.

Referring now to the figures, and in particular FIGS. 1 to 4, invention 10 in its preferred embodiment is a weldment including a base 12 comprising a pair of parallel, spaced apart I beams 14, with upper and lower flanges 16 and 18, respectively. Base 12 supports a rotatable turntable 20, rotatably powered by motor drive means 21. A two-piece, vertically extendible stanchion 22 includes an outer hollow rectangular stanchion 24 rigidly welded to a base connecting plate 26 extending across and welded to the upper flanges 16 of the I beams 14. An inner rectangular stanchion 28 telescopically fits within outer stanchion 24 and may be raised or lowered by hydraulic cylinder 30 secured to one side of outer stanchion 24 by cylinder clamp 32 and to the top end of inner stanchion 28 by bracket 34.

Figure 6:
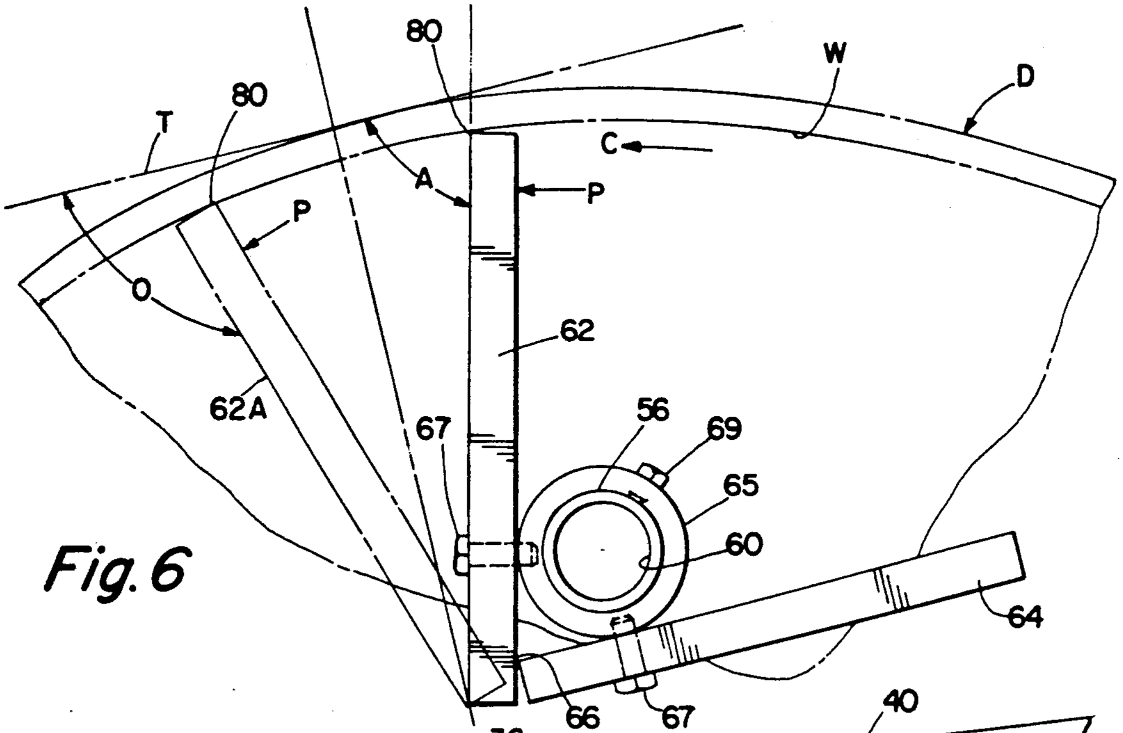
FIG. 6 is an enlarged fragmentary plan view of the inventive scraper and deflector blades taken along the line 6—6 of FIG. 3.

In the preferred embodiment of the invention, hydraulic cylinder 30 is selected to have a 64" stroke to raise and lower inner stanchion 28. A boom swivel 36 is secured to the top end 29 of inner stanchion 28. An L-shaped boom 38 comprises a horizontal leg 40 and a vertical leg 42 depending from one end 44 of horizontal leg 40. The opposite end 46 of horizontal leg 40 is secured to boom swivel 36 comprising a pintle 36*a* and a gudgeon 36*b*, to permit leg be pivoted about pintle in a horizontal plane. Vertical leg 42 of boom 38 is rigidly secured at its upper end 48 to end 44 of horizontal leg 40. Mounted on one side of vertical leg 42 is a product pump 50 driven by motor 52. Pump 50 is operatively connected to product inlet tube 54 having a lower end 56 which extends below vertical leg 42 and about 18". The outlet side of pump 50 is provided with an elbow 57 to which may be attached a tube extension 58, shown in phantom, of any length required to transport the product tot he location of the pulverizing machinery. With inner stanchion 28 in the fully retracted position, the inlet portion 60 of inlet tube 54 will be substantially at the level of the inner bottom surface B of the drum D. As best shown in FIG. 6, scraper and deflector blades 62 and 64, respectively, are secured to a threaded collar 65 by means of threaded fasteners 67. Threaded collar 65 is adapted to thread onto the lowermost end of inlet tube 54 and about and flush with inlet port 60. A set screw 69 is provided to lock collar 65 to inlet tube 54 in any desired angular position, one with respect to the other. In the preferred embodiment shown in FIG. 6, scraper blade 62 and deflector blade 64 make line contact at 66 to form an angle slightly less than 90°.

Collar 65 may be adjusted on inlet tube 54 to align scraper blade 62 at any desired angle to the tangent T of drum D inner wall surface W. An acute angle A is preferred, with drum D rotating in couterclockwise direction C, since the pressure P of the work product on the scraper blade 62 will maintain the scraper blade edge 80 in pressure contact with wall W of drum D. Were the scraper blade 62 set at an obtuse angle O, as shown in phantom at 62A, the pressure P of the work product would force blade edge 80 away from drum wall W, thereby defeating the purpose, or reducing the efficiency, of scraper blade 62. By releasing set screw 69, collar 65 may be rotated on inlet tube 54 to change angle A, depending on the viscosity of the work product or for any other reason calculated to improve the performance of scraper blade 62.

Figure 3:
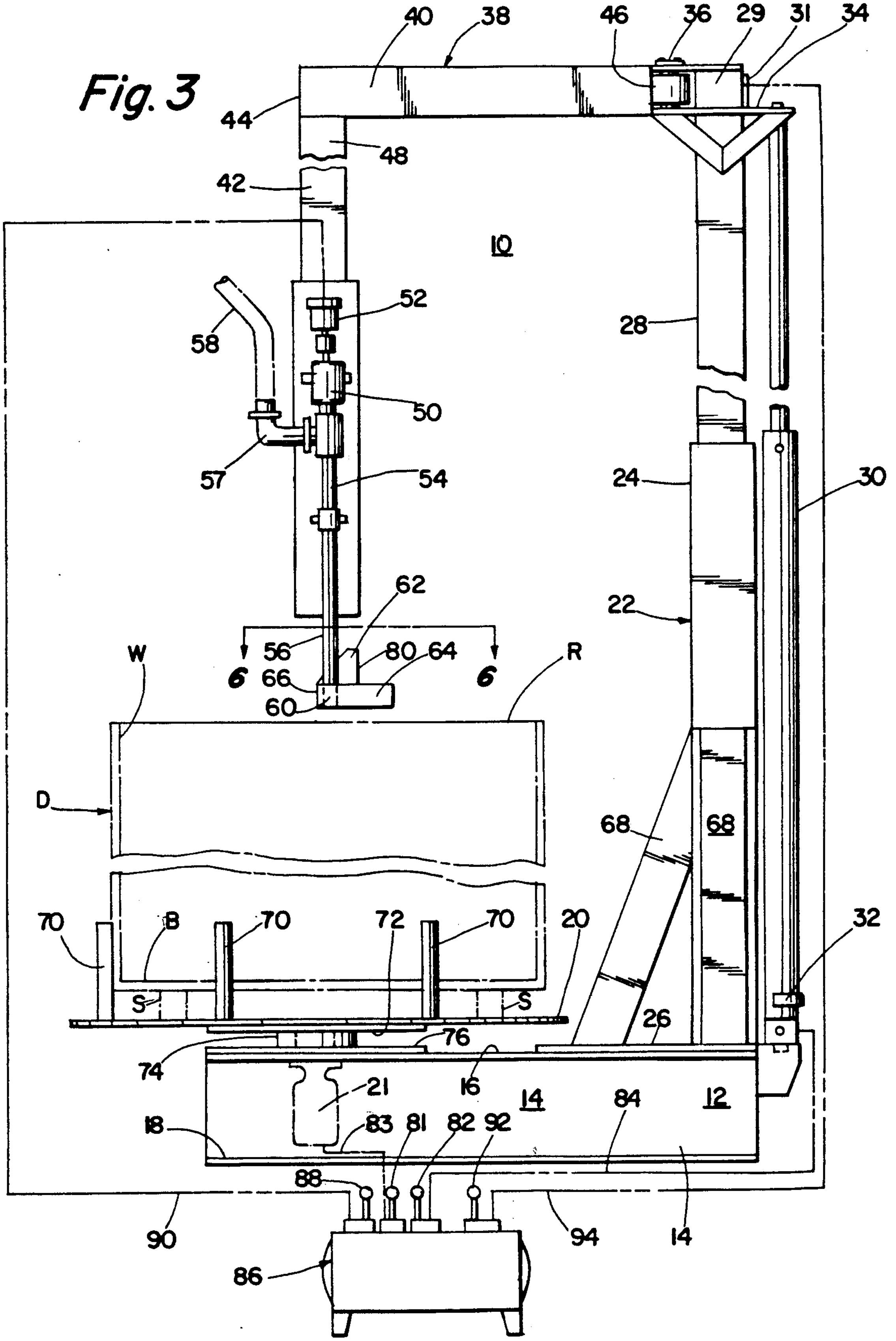
FIG. 3 is a front elevational view of the preferred embodiment of the invention showing the boom in the raised position.
Figure 4:
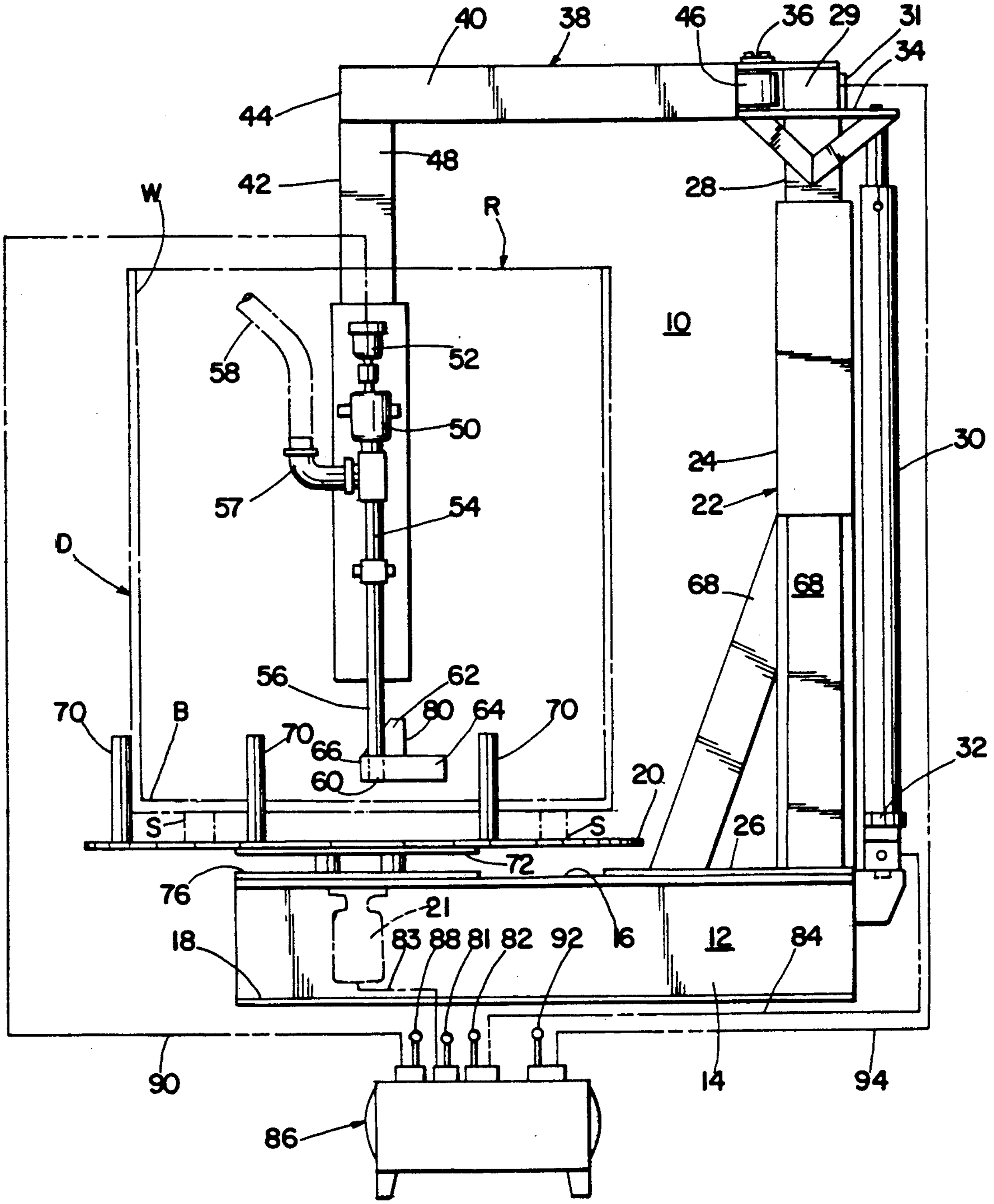
FIG. 4 is a front elevational view of the preferred embodiment of the invention showing the boom in the lowered position.
Figure 5:
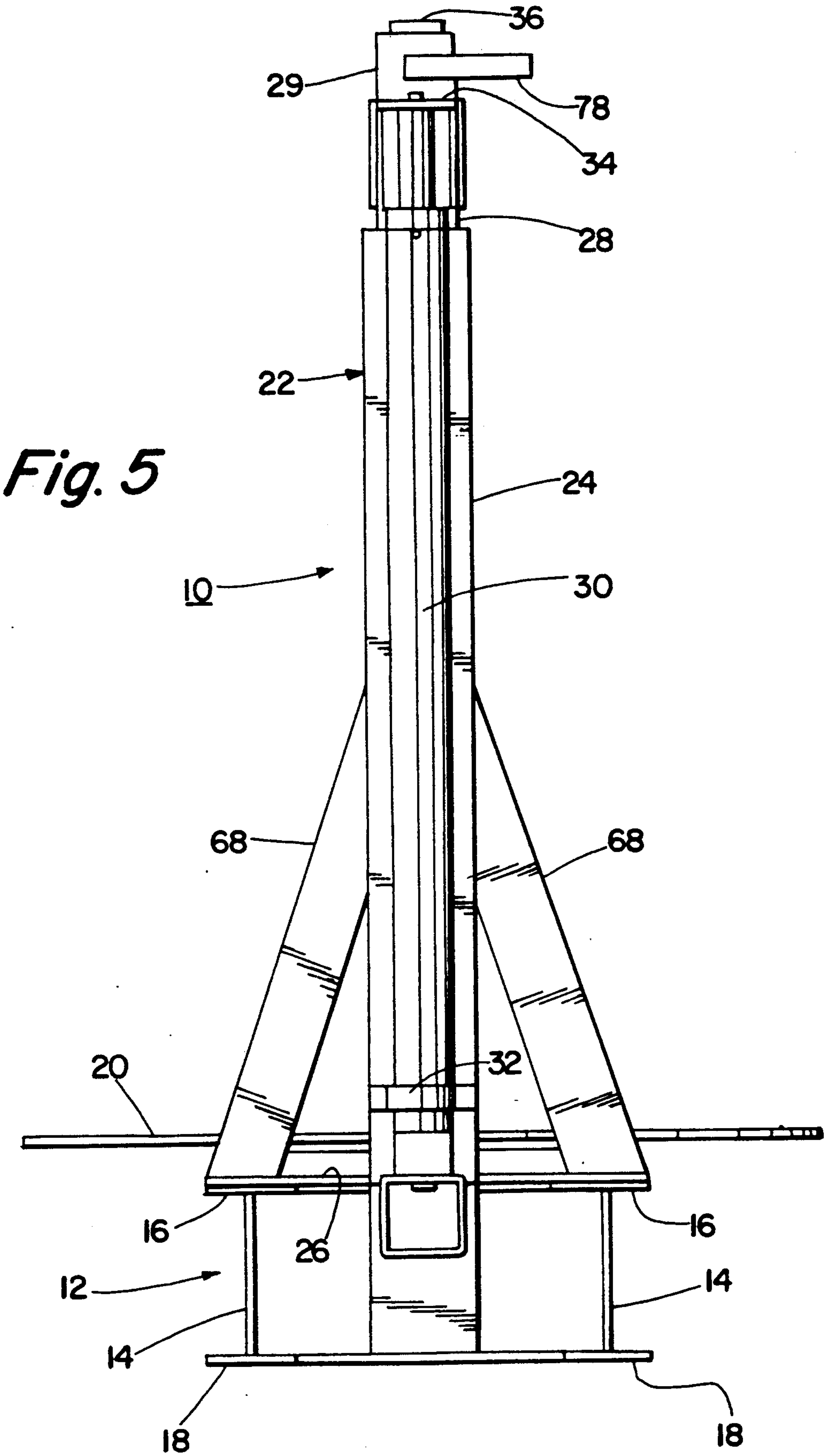
FIG. 5 is a side elevational view of the preferred embodiment of the invention showing the inner stanchion in the lowered position.

Stanchion 22 is stabilized by hollow rectangular structural members 68 welded to base connecting plate 26 and to three sides of stanchion 22. Vertical drum locating pins 70 are secured to turntable 20 to assist in positioning drum D on the turntable 20. Drum D rests on skids S. Referring to FIGS. 3 and 4, the turntable 20 is mounted on a support plate 72 which rests on antifriction bearing 74. Anti-friction bearing 74, in turn, is supported on base connecting plate 76. Motor 21 is drivingly connected to support plate 72, which, in turn, rotates turntable 20.

Figure 7:
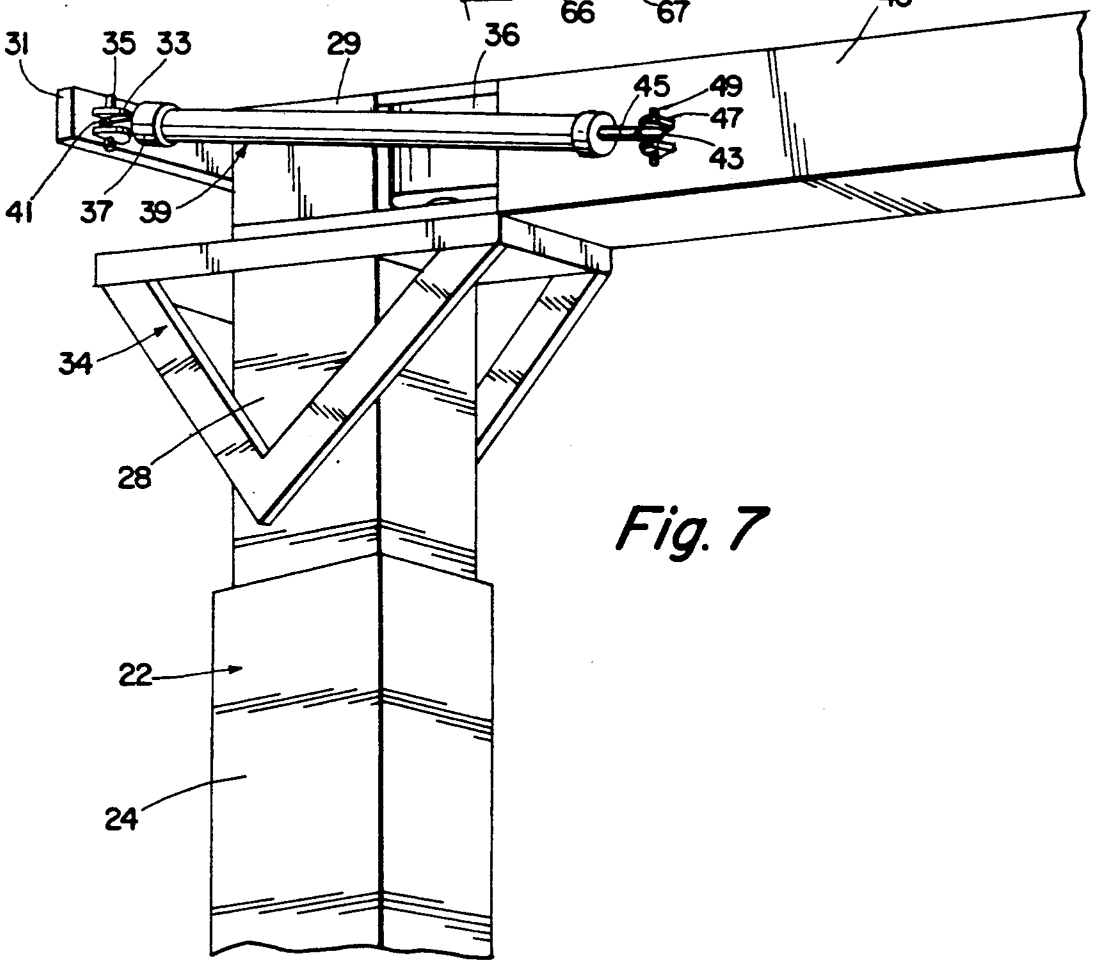
FIG. 7 is an enlarged fragmentary perspective view of the boom hydraulically actuated swivel mechanism.

As best shown in FIG. 7, a cantilevered pneumatic cylinder support bracket 31 is rigidly secured to the upper end 29 of inner stanchion 28. A clevis 33 and pin 35 secure end 37 of pneumatic cylinder 39 to support bracket 31. End 43 of piston 45 of pneumatic cylinder 39 is secured by clevis 47 and pin 49 to horizontal boom 40. By selective actuation of cylinder 39, boom 40 may be caused to pivot horizontally about pintle 36*a* attached to upper end 29 of inner stanchion 28. Referring to FIG. 6, since scraper blade 62 is secured by collar 65 to the lower end of inlet tube 54, which in turn is secured to vertical leg 42 of boom 38, by controlled pivoting of horizontal leg 40, scraper blade 62 may be selectively brought into and out of pressure contact with the interior wall W of drum D when drum D is positioned on turntable 20.

OPERATION OF THE INVENTION

Referring to FIG. 3, inner stanchion 28 is raised sufficiently to permit a drum D to pass beneath inlet port 60 or inlet tube 54. A drum D, on skids S, filled with the work product, is then transported to the inventive apparatus by means of a fork lift truck and deposited together with the skids S onto turntable 20 in positioning contact with locating pins 70. Inner stanchion 28 is then retracted by hydraulic cylinder 30 until nozzle 60 of inlet tube 54 is submerged beneath the surface of the product to create a seal which will permit pump 50 to draw product through port 60 into inlet tube 54. At substantially the same time, pneumatic cylinder 39, FIGS. 1 and 7, causes horizontal leg 40 to pivot horizontally until the vertical edge 80 of blade 62 is brought into pressure contact with the interior vertical wall W of drum D. Motor 21, FIG. 3, is then energized by motor control lever 81 and power line 83 of control center means 86 to rotate turntable 20. Depending on work product viscosity and other factors, rotation of the drum may range from 15 to 60 R.P.M. Hydraulic cylinder 30 is then actuated by control means lever 82 and hydraulic line 84 of control center means 86 to lower the inlet tube 54 into the work product at an even controlled rate. Simultaneously, control lever 88 and power line 90 regulate motor 52 to drive pump 50 at an even controlled rate which is synchronized with the actuation of hydraulic cylinder 30 so that inlet tube 54 is lowered at the same rate as the rate of lowering the level of the work product in the drum D. As the drum D rotates, deflector blade 64 acts to channel work product into inlet port 60.

As a consequence of the synchronization between pump 50 and hydraulic cylinder 30, when the inlet port 60 nears the bottom B of drum D, pump 50 will have withdrawn substantially all of the work product from the drum.

Lever 92 and pneumatic line 94 may then again be operated to actuate pneumatic cylinder 39 to shift scraper blade 62 away from pressure contact with interior wall surface W of drum D. Lever 82 is then shifted to reverse the pressure to hydraulic cylinder 30, thereby raising inner stanchion 28 until inlet tube port 60 is clear of the upper rim R of drum D. Drum D may then be removed on skids S by a fork lift truck and replaced with a full drum of work product. The entire cycle requires, on an average, about two hours.

It may occur to those skilled in the art, upon reading the specification in conjunction with a study of the drawings and claims, that certain modifications may be made in the apparatus without departing from the inventive concept, which is intended to be limited only by the scope of the appended claims.

What is claimed:

1. The method of transferring high viscosity liquid work product to a work station from a cylindrical storage drum having an open top, a closed bottom, and a longitudinal axis, comprising the steps of:

(a) vertically aligning the longitudinal axis of said work product-filled cylindrical work product transfer drum and adapting said drum to rotate about said vertical axis;

(b) rotating said work product transfer drum about said vertical axis;

(c) lowering a work product transfer tube into said transfer drum at a predetermined rate while said drum is rotating;

(d) scraping work product from the interior wall surface of said drum while said drum is rotating;

(e) pumping work product from said drum at a predetermined rate syncrhonized with the rate of lowering said work product transfer tube into said drum;

(f) setting said work product pumping predetermined rate to cause said drum to be emptied of work product coincident with the lowering of said work product transfer tube to the bottom of said drum; and (g) lowering said work product transfer tube to the bottom of said drum.

2. The method of claim 1, including the step of directing work product into said work product transfer tube while said tube is being lowered into said work product transfer drum.

3. Apparatus for transferring high viscosity liquid work product from a cylindrical storage drum to a work station comprising: a turntable adapted to support and to rotate a work product transfer drum; means to rotate said turntable; a work product transfer tube having a lower open end; hydraulic means adapted to lower said work product transfer tube at a predetermined rate into a work product transfer drum; scraper means adapted to scrape work product from the interior wall surface of said transfer drum; means to pump work product from said work product transfer drum through said work product transfer tube at a predetermined rate; and means adapted to synchronize the rate of lowering of said transfer tube into a work product transfer drum with the rate of pumping work product from said work product transfer drum through said work product transfer tube, whereby said work product transfer drum will be emptied of work product when the lower end of the work product transfer tube reaches the bottom of said work product transfer drum; said scraper means comprising a first blade secured to said lower end of said work product transfer tube and having a leading edge adapted to engage the interior wall surface of a rotating work product transfer drum and adapted to scrape work product from said wall surface, said scraper means including a second blade secured to the lower end of said work product transfer tube and joined with said first blade at said work product transfer tube to form a V-shaped configuration; said second blade being adapted to direct work product in a rotating drum into the lower end of said work product transfer tube.

4. The apparatus of claim 3, wherein said first and second blades are substantially planar and aligned in vertical planes.

5. Apparatus for transferring high viscosity liquid work product from a cylindrical storage drum to a work station comprising: means adapted to rotate a cylindrical drum of work product; a work product withdrawal tube; hydraulic means adapted to lower said work product withdrawal tube at a predetermined rate into said drum; means adapted to withdraw work product from said drum at a predetermined rate through said withdrawal tube; means adapted to synchronize the rate of lowering said work product withdrawal tube with the withdrawal rate of work product through said work product withdrawal tube; vertically aligned blade means secured to said work product withdrawal tube adapted to direct work product into said work product withdrawal tube; said vertically aligned blade means being secured to said work product withdrawal tube adapted to scrape work product from the interior wall surface of a transfer drum; including a first vertically aligned blade secured to said work product withdrawal tube adapted to direct work product into said work product withdrawal tube, and a second vertically aligned blade secured to said work product withdrawal tube adapted to scrape work product from the interior wall surface of said cylindrical storage drum, said first and second blades being secured at said work product withdrawal tube to form an acute angle adapted so that the pressure of work product against said second vertically aligned blade urges said second vertically aligned blade into contact with the interior wall surface of said cylindrical storage drum.

6. The apparatus of claim 5, wherein said second vertically aligned blade has a vertical leading face and a vertical trailing face and said leading face forms an acute angle with the interior wall surface of said cylindrical storage drum, and hydraulic means to urge said vertically aligned blade into contact with said interior wall surface of said cylindrical storage drum.

7. Apparatus for transferring high viscosity liquid work product from a cylindrical storage drum to a work station comprising: a base; a turntable rotatably mounted on said base; a two-piece stanchion, with a first piece rigidly secured to said base adjacent said turntable and a second piece vertically shiftable relative to said first piece; means to vertically shift said second piece; a horizontal boom having a fixed end swivelly secured to the upper end of said second piece, and a free end; a boom extension arm rigidly secured to the free end of said boom to depend vertically therefrom; means to swivel said boom in a horizontal plane over said turntable; a product transfer tube secured to said boom extension arm and having a free end projecting vertically downward beneath said boom vertical arm; work product scraper means secured to the free end of said work product transfer tube; pump means secured to said boom extension arm adapted to draw work product vertically up said work product transfer tube; means adapted to position a cylindrical ink transfer drum on said turntable; means adapted to lower and to raise said boom extension arm into and out of a work product transfer drum positioned on said turntable; said scraper means being adapted to be urged by said extension arm into and out of contact with the interior wall surface of a work product transfer drum; and means adapted to lower said work product transfer tube in synchronization with the withdrawal of work product form an ink transfer drum so that the lower end of said work product transfer tube is adapted to reach the bottom of a work product transfer drum simultaneously with the emptying of said work product transfer drum by said pump means.

* * * * *